United States Patent
Barr et al.

(10) Patent No.: US 12,467,303 B2
(45) Date of Patent: *Nov. 11, 2025

(54) PIVOTING CURSOR FOR FRAMELESS GLASS IN A VEHICLE

(71) Applicant: INTEVA PRODUCTS, LLC, Troy, MI (US)

(72) Inventors: Geoffrey Barr, Troy, MI (US); Sadmira Beganovic, Macomb Township, MI (US); Bruce Rokicki, Rochester Hills, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/713,758

(22) Filed: Apr. 5, 2022

(65) Prior Publication Data
US 2022/0314762 A1 Oct. 6, 2022

Related U.S. Application Data

(60) Provisional application No. 63/171,407, filed on Apr. 6, 2021.

(51) Int. Cl.
*B60J 10/74* (2016.01)
*E05F 11/38* (2006.01)

(52) U.S. Cl.
CPC ....... *E05F 11/385* (2013.01); *E05F 2011/387* (2013.01); *E05Y 2600/502* (2013.01); *E05Y 2600/51* (2013.01); *E05Y 2900/55* (2013.01)

(58) Field of Classification Search
CPC ..... B60J 10/74; B60J 1/006; B60J 1/17; B60J 1/004; B60J 5/0419; E05Y 2600/12;
(Continued)

(56) References Cited

U.S. PATENT DOCUMENTS 4,051,632 A * 10/1977 Fukumoto ............. E05F 11/382
49/227
5,070,648 A * 12/1991 Moriyama ............ E05F 11/486
49/502
(Continued)

FOREIGN PATENT DOCUMENTS

DE  10331001 A1  4/2004
EP  2447456 A1   5/2012
(Continued)

OTHER PUBLICATIONS

Chinese Office Action for Chinese Application No. 202220786215.0 Issued Jul. 19, 2022, 2 Pages (No English Translation).
(Continued)

*Primary Examiner* — Catherine A Kelly
*Assistant Examiner* — Patrick B. Ponciano
(74) *Attorney, Agent, or Firm* — CANTOR COLBURN LLP

(57) ABSTRACT

A pivoting cursor for a frameless window of a vehicle door, including: a main body portion; a pivoting plate pivotally secured to the main body portion for pivotal movement about an axis; a glass clamping plate; a seal; an adjusting screw for pivoting the pivoting plate with respect to the main body portion, the adjusting screw having a first threaded portion for threadingly engaging an opening in the main body portion; and a locking nut for threadingly engaging a second threaded portion of the adjusting screw, wherein the locking nut is located on an inboard side of the pivoting cursor.

16 Claims, 4 Drawing Sheets

(58) Field of Classification Search
CPC ............... E05Y 2600/40; E05Y 11/385; E05Y 2900/55; E05Y 2600/502; E05Y 2600/51; E05F 11/382; E05F 11/385; E05F 2011/387
USPC .................................................. 49/374, 375
See application file for complete search history.

(56) References Cited

U.S. PATENT DOCUMENTS

| | | | |
|---|---|---|---|
| 5,363,595 A | 11/1994 | Wirsing | |
| 5,729,930 A | 3/1998 | Schust et al. | |
| 5,987,820 A | 11/1999 | Shibanushi | |
| 6,119,403 A | 9/2000 | Klippert et al. | |
| 6,453,617 B1* | 9/2002 | Klippert | E05F 11/385 49/375 |
| 6,854,213 B2 | 2/2005 | Galliani | |
| 7,596,908 B2* | 10/2009 | Rothe | E05F 11/385 49/374 |
| 8,096,080 B2 | 1/2012 | Pavlovic et al. | |
| 8,381,446 B2* | 2/2013 | Trevarrow | E05F 11/385 49/375 |
| 10,273,733 B2 | 4/2019 | Huang et al. | |
| 11,162,291 B2 | 11/2021 | Reames et al. | |
| 11,168,501 B2 | 11/2021 | Pavlovic | |
| 11,377,892 B2* | 7/2022 | Hampel | E05F 11/483 |
| 11,499,361 B2* | 11/2022 | Magazzini | E05F 11/488 |
| 11,577,583 B2* | 2/2023 | Barr | B60J 1/006 |
| 2004/0088924 A1 | 5/2004 | Moser et al. | |
| 2006/0260200 A1* | 11/2006 | Bigourden | E05F 11/385 49/374 |
| 2007/0022665 A1* | 2/2007 | Bigourden | E05F 11/385 49/375 |
| 2009/0007494 A1 | 1/2009 | Pavlovic et al. | |
| 2010/0043297 A1 | 2/2010 | Barr et al. | |
| 2018/0326820 A1 | 11/2018 | Huang et al. | |
| 2019/0226261 A1* | 7/2019 | Taubmann | E05F 11/483 |
| 2020/0173212 A1* | 6/2020 | Pavlovic | E05F 11/385 |
| 2020/0338965 A1 | 10/2020 | Barr et al. | |
| 2020/0386026 A1 | 12/2020 | Reames et al. | |
| 2022/0314762 A1* | 10/2022 | Barr | B60J 1/17 |
| 2022/0410669 A1* | 12/2022 | Ramesh et al. | E05F 11/385 49/375 |
| 2024/0191551 A1* | 6/2024 | Taubmann | B60J 1/17 |

FOREIGN PATENT DOCUMENTS

| | | |
|---|---|---|
| JP | H0754538 A | 2/1995 |
| WO | 2007096540 A1 | 8/2007 |
| WO | 2020022021 A1 | 1/2020 |

OTHER PUBLICATIONS

French Office Action for French Application No. 2203134 Issued Jun. 21, 2022, 2 Pages (No English Translation).
German Office Action for German Application No. 202022101779.4 Issued May 6, 2022, 1 Page.
French Search Report corresponding to FR Application No. 2203134; Issue Date, Jan. 23, 2024.
Extended European Search Report for EP Application No. 20794540.3; Issue Date; Aug. 12, 2022, 7 pages.
International Search Report for PCT/US2020/030076; Mailing Date, Jul. 20, 2020, 2 pages.
U.S. Non-Final Office Action corresponding to U.S. Appl. No. 16/859,390; Issue Date; Jun. 17, 2022, 15 pages.
Written Opinion of the International Searching Authority for PCT/US2020/030076; Issue Date, Jun. 20, 2020, 4 pages.
Chinese First Office Action corresponding to CN Application No. 202210356382.6; Issue date, Jul. 19, 2025, 28 pages.

* cited by examiner

PIVOTING CURSOR FOR FRAMELESS GLASS IN A VEHICLE

CROSS REFERENCE TO RELATED APPLICATIONS

This application claims the benefit of U.S. Provisional Patent Application Ser. No. 63/171,407 filed on Apr. 6, 2021, the entire contents of which are incorporated herein by reference thereto.

BACKGROUND

Exemplary embodiments of the present disclosure pertain to the art of vehicle windows and in particular frameless window systems.

Frameless window systems are adjusted for glass sealing in the Y direction by adjusting the regulator rails by means of slotted brackets or Jack screws.

However, this method can limit the stiffness of the system, is costly in tools and components, and can adversely affect the glass system deflection. In addition and when the adjustment is performed on the rail, additional clearances are needed in the door for rail packaging.

BRIEF DESCRIPTION

Disclosed is a pivoting cursor for a frameless window of a vehicle door, including: a main body portion: a pivoting plate pivotally secured to the main body portion for pivotal movement about an axis: a glass clamping plate: a seal: an adjusting screw for pivoting the pivoting plate with respect to the main body portion, the adjusting screw having a first threaded portion for threadingly engaging an opening in the main body portion; and a locking nut for threadingly engaging a second threaded portion of the adjusting screw, wherein the locking nut is located on an inboard side of the pivoting cursor.

In addition to one or more of the features described above, or as an alternative to any of the foregoing embodiments, the adjusting screw includes a flange portion that is larger than an opening in the clamping plate that the adjusting screw slidably passes through.

In addition to one or more of the features described above, or as an alternative to any of the foregoing embodiments, the flange portion is received in an opening of the pivoting plate.

In addition to one or more of the features described above, or as an alternative to any of the foregoing embodiments, a portion of a vehicle window is located between the pivoting plate and the clamping plate.

In addition to one or more of the features described above, or as an alternative to any of the foregoing embodiments, the seal is located between the window and the pivoting plate and the clamping plate.

In addition to one or more of the features described above, or as an alternative to any of the foregoing embodiments, a glass clamp screw secures the window to the pivoting cursor by threadingly engaging a threaded opening in the pivoting plate.

In addition to one or more of the features described above, or as an alternative to any of the foregoing embodiments, the pivoting plate is rotationally mounted to a pivot pin that is secured to the main body portion.

In addition to one or more of the features described above, or as an alternative to any of the foregoing embodiments, the adjusting screw passes through an opening in the clamping plate and an opening in the pivoting plate and the adjusting screw does not threadingly engage the opening the clamping plate and the opening in the pivoting plate.

In addition to one or more of the features described above, or as an alternative to any of the foregoing embodiments, the first threaded portion and the opening in the main body portion are configured such that rotation of the adjusting screw therein will cause the pivoting plate to pivot about the axis and cause a portion of the pivoting plate to move in a direction away from a portion of the main body portion proximate to the adjusting screw, which will also cause movement of the glass clamping plate, the seal and a window that is received within the seal.

Also disclosed is a door module, including: a window regulator secured to an inner door panel of the door module, the window regulator including a pair of guide rails fixedly secured to the inner door panel of the door module; and a pivoting cursor for slidably engaging one of the pair of guide rails, the pivoting cursor including: a main body portion: a pivoting plate pivotally secured to the main body portion for pivotal movement about an axis: a glass clamping plate: a seal: an adjusting screw for pivoting the pivoting plate with respect to the main body portion, the adjusting screw having a first threaded portion for threadingly engaging an opening in the main body portion; and a locking nut for threadingly engaging a second threaded portion of the adjusting screw, wherein the locking nut is located on an inboard side of the pivoting cursor when the window regulator is secured to the door module.

In addition to one or more of the features described above, or as an alternative to any of the foregoing embodiments, the adjusting screw includes a flange portion that is larger than an opening in the clamping plate that the adjusting screw slidably passes through.

In addition to one or more of the features described above, or as an alternative to any of the foregoing embodiments, the flange portion is received in an opening of the pivoting plate.

In addition to one or more of the features described above, or as an alternative to any of the foregoing embodiments, a portion of a vehicle window is located between the pivoting plate and the clamping plate.

In addition to one or more of the features described above, or as an alternative to any of the foregoing embodiments, the seal is located between the window and the pivoting plate and the clamping plate.

In addition to one or more of the features described above, or as an alternative to any of the foregoing embodiments, a glass clamp screw secures the window to the pivoting cursor by threadingly engaging a threaded opening in the pivoting plate.

In addition to one or more of the features described above, or as an alternative to any of the foregoing embodiments, the adjusting screw passes through an opening in the clamping plate and an opening in the pivoting plate and the adjusting screw does not threadingly engage the opening the clamping plate and the opening in the pivoting plate.

In addition to one or more of the features described above, or as an alternative to any of the foregoing embodiments, the first threaded portion and the opening in the main body portion are configured such that rotation of the adjusting screw therein will cause the pivoting plate to pivot about the axis and cause a portion of the pivoting plate to move in a direction away from a portion of the main body portion proximate to the adjusting screw, which will also cause movement of the glass clamping plate, the seal and a window that is received within the seal.

In addition to one or more of the features described above, or as an alternative to any of the foregoing embodiments, the door module is a front door module or a rear door module and a frameless window is secured to the pivoting cursor.

In addition to one or more of the features described above, or as an alternative to any of the foregoing embodiments, the pivoting cursor is a pair of pivoting cursors each one of the pair of pivoting cursors being slidably secured to a respective one of the pair of guide rails.

Also disclosed is a method of mounting a frameless window of a vehicle to a door module, including: securing a portion of the frameless window to a pivoting cursor slidably engaging one of a pair of guide rails of a window regulator secured to the door module; and adjusting a location of the frameless window by pivoting a pivoting plate of the pivoting cursor with respect to a main body portion of the pivoting cursor, the pivoting cursor further comprising an adjusting screw for pivoting the pivoting plate with respect to the main body portion, the adjusting screw having a first threaded portion for threadingly engaging an opening in the main body portion; and a locking nut for threadingly engaging a second threaded portion of the adjusting screw, wherein the locking nut is located on an inboard side of the pivoting cursor when the window regulator is secured to the door module.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
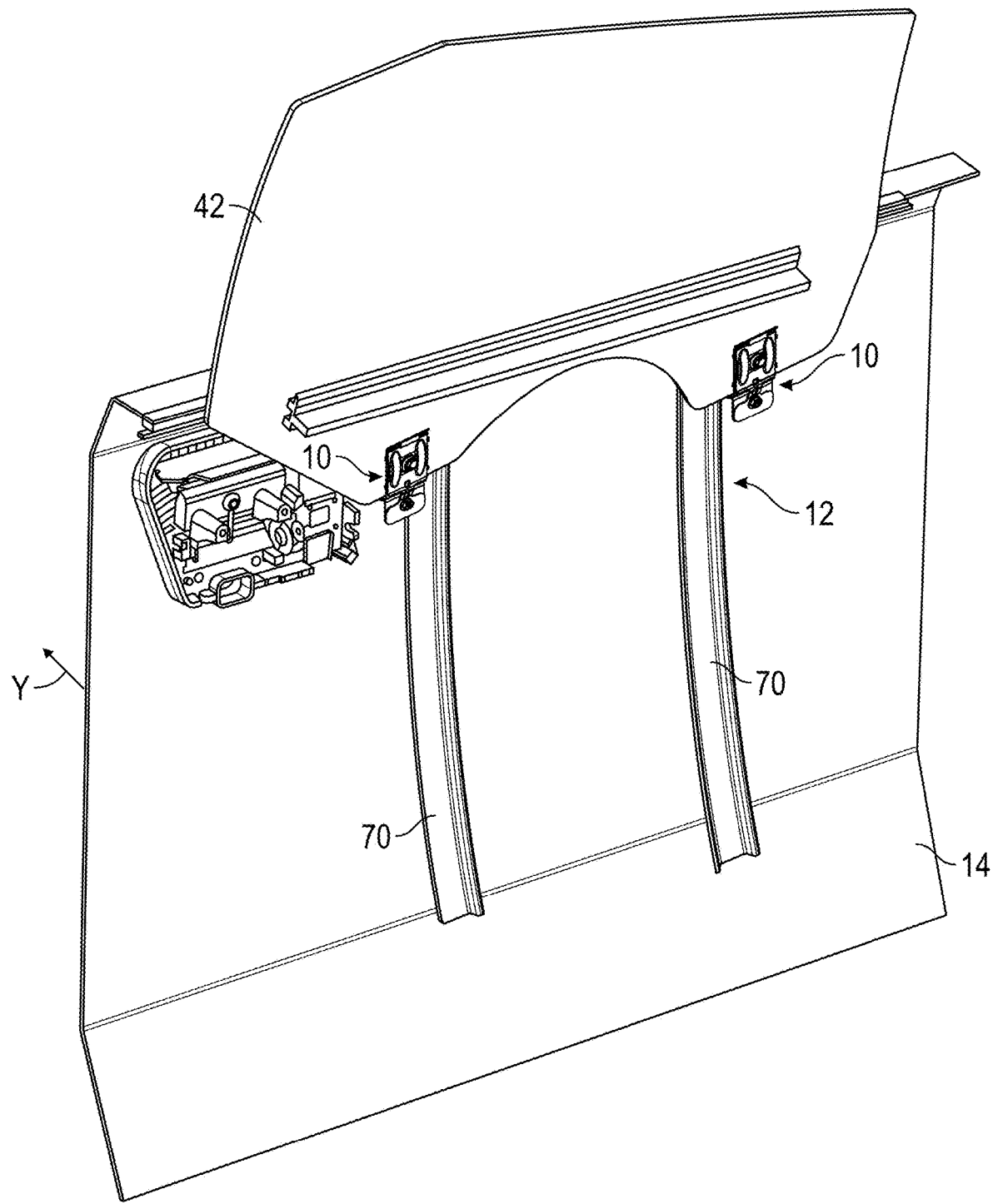
FIG. 1 is a partial perspective view of a vehicle door and window with a pivoting cursor in accordance with the present disclosure.

A detailed description of one or more embodiments of the disclosed apparatus and method are presented herein by way of exemplification and not limitation with reference to the Figures.

The present disclosure is directed to a cursor with four main elements: a cursor body that is configured to slide along a rail: a pivoting plate or swing plate with a threaded adjuster: a clamping plate; and an isolator which is captured in the assembly by a clamp screw which is partially installed into the sub assembly for ease of assembly at the original equipment manufacturer (OEM).

Referring now to the FIGS. and in particular FIGS. 1-4, a pivoting cursor 10 for use with a window regulator 12 of a vehicle door module 14 is illustrated. The pivoting cursor 10 includes a main body portion 16, a pivoting plate or swing plate 18 pivotally secured to the main body portion 16 by a pivot pin 19 for pivotal movement about an axis 20, a clamping plate or glass clamping plate 22, a seal or isolator 24, an adjusting screw or threaded adjuster 26 for pivoting the pivoting plate 18 with respect to the main body portion 16 and a locking nut 28 for maintaining the adjusting screw or threaded adjuster 26 in a desired position once the cursor 10 has been adjusted via rotational movement of the adjusting screw or threaded adjuster 26.

In one embodiment, the pivoting plate or swing plate 18 is rotationally or pivotally mounted to the pivot pin 19 or a shaft, rod or elongated member 19 that is secured to the main body portion 16. In one embodiment, the adjusting screw or threaded adjuster 26 includes a first threaded portion 30 for threadingly engaging a threaded opening 32 of the cursor body 16. In addition, the adjusting screw or threaded adjuster 26 also includes a flange portion 34 that is larger than an opening 36 in the clamping plate or glass clamping plate 22. The adjusting screw or threaded adjuster 26 also includes a second threaded portion 38 that threadingly engages threads 40 of the locking nut 28. In one non-limiting embodiment, the flange portion 34 is received in an opening 35 of the pivoting plate or swing plate 18.

In one non-limiting embodiment, the adjusting screw or threaded adjuster 26 does not threadingly engage the clamping plate 22 and the pivoting plate or swing plate 18 but merely slides through opening 36 and opening 35.

A portion of a vehicle window 42 is located between the pivoting plate or swing plate 18 and the glass clamp plate 22. A seal or isolator 24 is located between the window 42 and the pivoting plate or swing plate 18 and the glass clamp plate 22. In order to secure the window 42 to the pivoting cursor 10, a glass clamp screw 44 threadingly engages a threaded opening 46 in the pivoting plate or swing plate 18. The glass clamp screw 44 has a head portion 48 that is larger than an opening 50 in the glass clamp plate 22 such that the glass clamp screw 44 secures the glass 42 to the pivoting cursor 10 when the glass clamp screw 44 threadingly engages the threaded opening 46 in the pivoting plate or swing plate 18. The glass clamp screw 44 also passes through an opening 52 in the window 42.

Once the pivoting plate or swing plate 18 is secured to the main body portion 16 via adjusting screw or threaded adjuster 26 engaging threaded opening 32, rotation of the adjusting screw or threaded adjuster 26 about axis 54 will cause the pivoting plate or swing plate 18 and glass clamp plate 22 to move in the directions of arrows 56 along axis 54. This movement will cause the pivoting plate or swing plate 18 to pivot about axis 20 about pivot pin 19, which will in turn cause movement of the window 42 in order to provide an adjustment in the Y-direction when installing the window 42 in a vehicle. This is particularly useful in a frameless door window design. In addition and by configuring the cursor 10 such that the adjusting screw or threaded adjuster 26 can be rotated by a tool from an inboard side 58 of the vehicle allows for convenient access when the vehicle window 42 is being installed in a vehicle.

Figure 2:
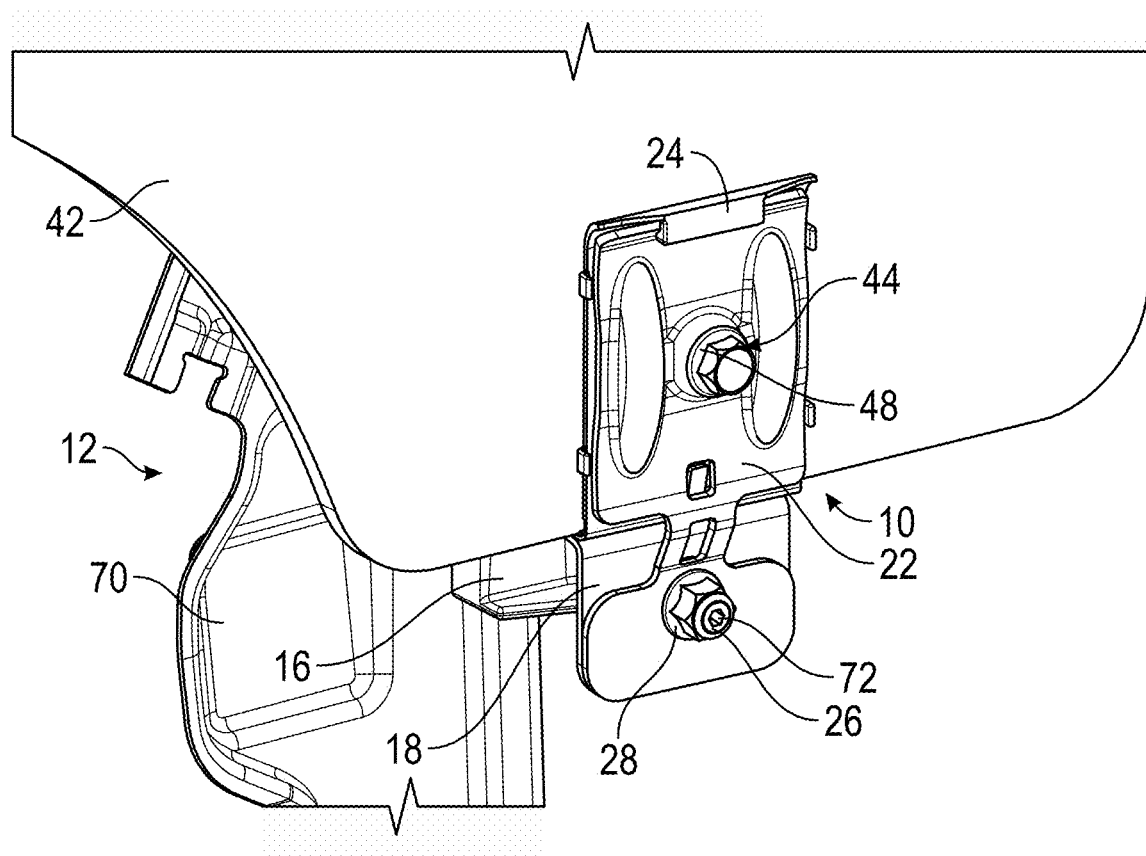
FIG. 2 is a partial perspective view of an inboard side of a window regulator with a pivoting cursor in accordance with the present disclosure.
Figure 3:
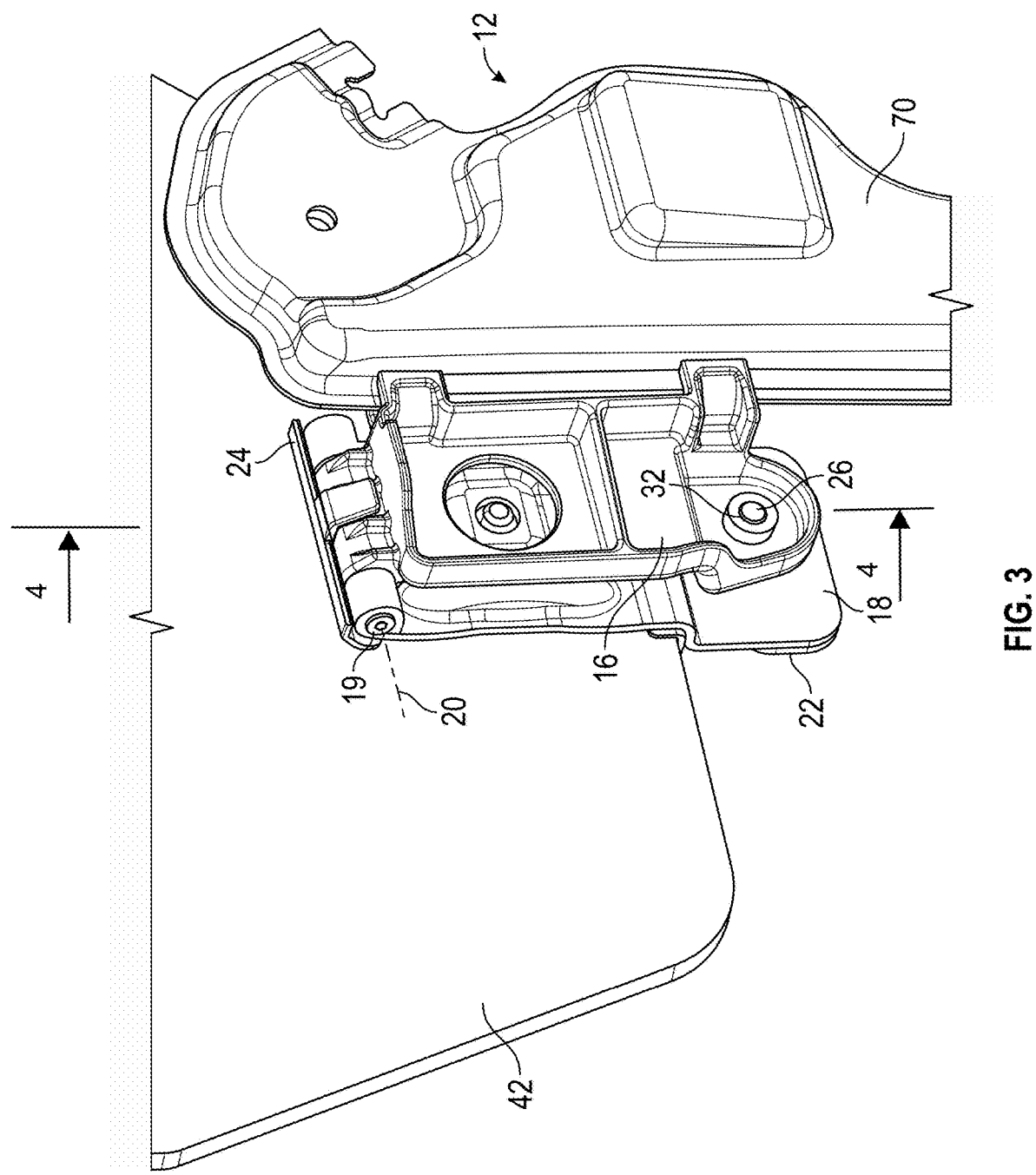
FIG. 3 is a partial perspective view of an outboard side of a window regulator with a pivoting cursor in accordance with the present disclosure.
Figure 4:
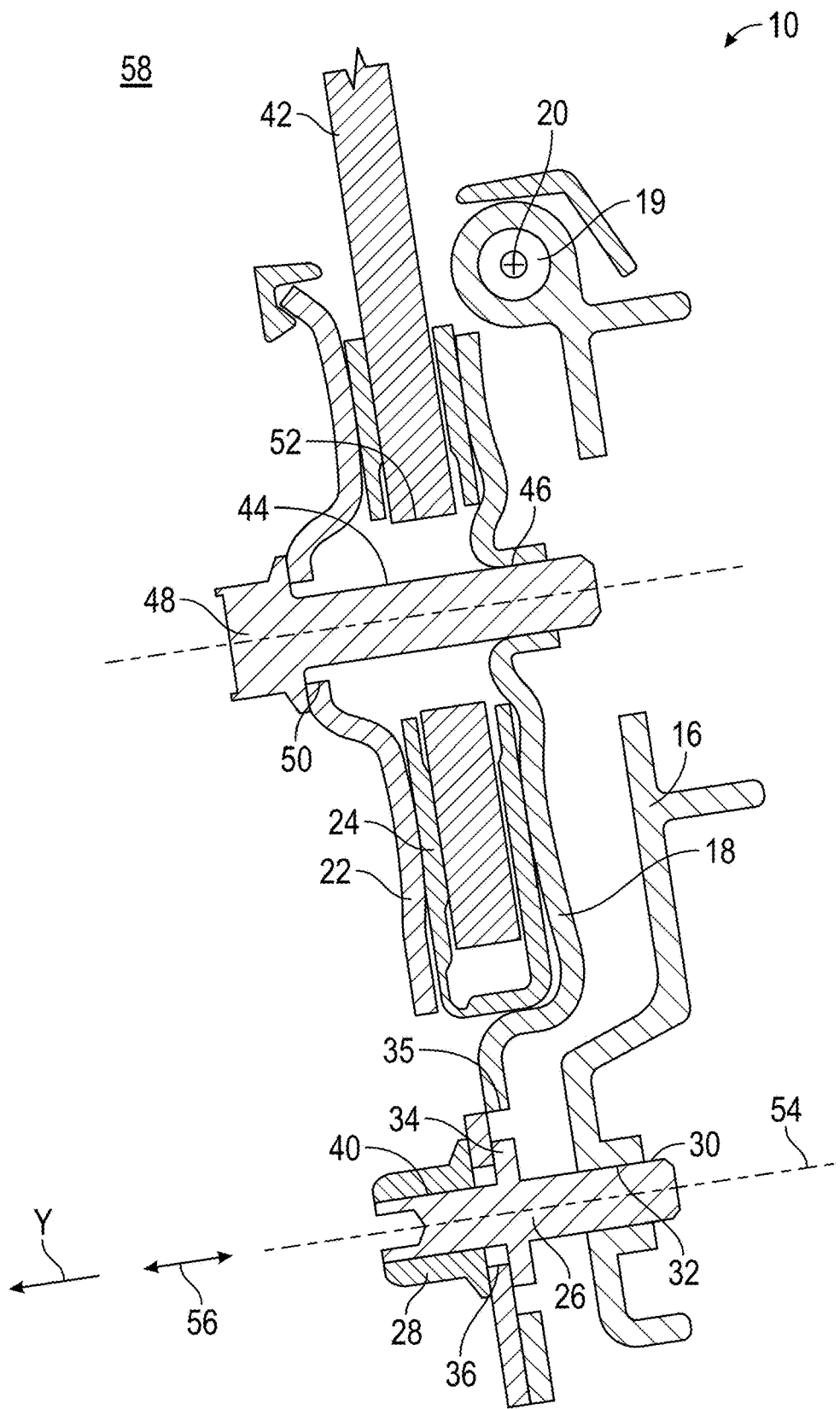
FIG. 4 is cross-sectional view along lines 4-4 of FIG. 3 illustrating the pivoting cursor secured to a window in accordance with the present disclosure.

As illustrated in at least FIGS. 1-3, the pivoting cursor 10 is configured to slidably engage a rail 70 of the window regulator 12. In FIG. 1, the window regulator 12 is a dual window regulator having a pair of guide rails 70 and a pair of cursors 10. As illustrated in FIG. 2, the rails 70 of the window regulator 10 are located outboard of the vehicle window. Also illustrated in FIG. 2 is that the adjusting screw or threaded adjuster 26 has a recess 72 configured to engage a complementary tool in order to adjust the position of the pivoting cursor 10 by rotating the adjusting screw or threaded adjuster 26.

In one non-limiting embodiment, a window regulator 12 for a front door assembly only uses the pivoting cursor 10 for the rear portion of the window 42 while a separate non-pivoting cursor is used for the forward portion of the window 42 each being slidably secured to a respective one of the guide rails 70. In another non-limiting embodiment, the window regulator 12 for the front door assembly uses a pivoting cursor 10 for both the rear portion of the window 42 and the forward portion of the window 42 each being slidably secured to a respective one of the guide rails 70. In yet another non-limiting embodiment, the window regulator 12 used with a rear door assembly employs the pivoting cursor 10 for both the forward portion of the window 42 and the rear portion of the window 42, each being slidably secured to a respective one of the guide rails 70. Still further and in yet another alternative embodiment, the window regulator for a rear door assembly may use a pivoting cursor for only the rear portion of the window 42 and a separate non-pivoting cursor for the forward portion of the window 42 each being slidably secured to a respective one of the guide rails 70. In yet another alternative and in either the front door assembly or the rear door assembly the pivoting cursor may be used for the forward portion of the window 42 and a non-pivoting cursor may be used for the rear portion of the window each being slidably secured to a respective one of the guide rails 70.

The pivoting cursors 10 are adjustable from an inboard side of the vehicle with or without the door closed. The adjusting screw or threaded adjuster 26 may be rotated to adjust the location of the pivoting cursor 10 and accordingly window 42. Once the adjustment corresponding to the precise and actual geometry of the vehicle which variates due to construction tolerances, the adjusting screw or threaded adjuster 26 is held in position by a first tool inserted into opening 72 while the locking nut 28 is tightened with a second tool such that position of the pivoting plate or swing plate 18 with respect to the main body portion 16 defined and any further rotation of the adjusting screw or threaded adjuster 26 is prevented.

In one alternative embodiment, the guide rail 70 is a hollow tube or structure formed from a metal such as aluminum, steel, metallic alloys or the hollow tube formed from a plastic material, or a plastic composite material. Still further and in one nonlimiting embodiment, the main body portion 16 of the pivoting cursor 10 or a portion thereof is configured to completely surround a periphery of the guide rail 70. As such, the portion of the main body portion 16 of the pivoting cursor 10 surrounding the guide rail 70 will have multiple contact points with the guide rail in order to prevent twisting of the pivoting cursor as it slides up and down the guide rail 70.

In one non-limiting embodiment, the main body portion 16 of the pivoting cursor 10 is formed from an easily molded material such as plastic of nylon and the main body portion 16 is configured to have a have an insert such as a polyoxymethylene (POM) insert that defines an opening for the guide rail 70 to slide therethrough. In one embodiment, the main body portion 16 of the pivoting cursor 10 is overmolded onto the insert 271. In one embodiment, the main body 16 of the pivoting cursor 10 is a nylon cursor overmolded onto the polyoxymethylene (POM) insert.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pivoting cursor for a frameless window of a vehicle door, comprising:
    a main body portion;
    a pivoting plate pivotally secured to the main body portion for pivotal movement about an axis;
    a glass clamping plate;
    a seal;
    an adjusting screw for pivoting the pivoting plate with respect to the main body portion, the adjusting screw having a first threaded portion for threadingly engaging an opening in the main body portion, wherein the adjusting screw passes through an opening in the glass clamping plate and an opening in the pivoting plate and the adjusting screw does not threadingly engage the opening in the glass clamping plate and the opening in the pivoting plate;
    a locking nut for threadingly engaging a second threaded portion of the adjusting screw, wherein the locking nut is located on an inboard side of the pivoting cursor; and
    a glass clamp screw secures the frameless window to the pivoting cursor by threadingly engaging a threaded opening in the pivoting plate.

2. The pivoting cursor as in claim 1, wherein the adjusting screw includes a flange portion that is larger than the opening in the glass clamping plate that the adjusting screw slidably passes through.

3. The pivoting cursor as in claim 2, wherein the flange portion is received in the opening of the pivoting plate.

4. The pivoting cursor as in claim 1, wherein a portion of the frameless window is located between the pivoting plate and the glass clamping plate.

5. The pivoting cursor as in claim 4, wherein the seal is located between the frameless window and the pivoting plate and the glass clamping plate.

6. The pivoting cursor as in claim 1, wherein the pivoting plate is rotationally mounted to a pivot pin that is secured to the main body portion.

7. The pivoting cursor as in claim 1, wherein the first threaded portion and the opening in the main body portion are configured such that rotation of the adjusting screw therein will cause the pivoting plate to pivot about the axis and cause a portion of the pivoting plate to move in a direction away from a portion of the main body portion proximate to the adjusting screw, which will also cause movement of the glass clamping plate, the seal and the frameless window that is received within the seal.

8. A door module, comprising:
a window regulator secured to an inner door panel of the door module, the window regulator including a pair of guide rails fixedly secured to the inner door panel of the door module; and
a pivoting cursor for slidably engaging one of the pair of guide rails, the pivoting cursor comprising:
a main body portion;
a pivoting plate pivotally secured to the main body portion for pivotal movement about an axis;
a glass clamping plate;
a seal;
an adjusting screw for pivoting the pivoting plate with respect to the main body portion, the adjusting screw having a first threaded portion for threadingly engaging an opening in the main body portion; and
a locking nut for threadingly engaging a second threaded portion of the adjusting screw, wherein the locking nut is located on an inboard side of the pivoting cursor when the window regulator is secured to the door module, wherein the adjusting screw includes a flange portion that is larger than an opening in the glass clamping plate that the adjusting screw slidably passes through and the flange portion is received in an opening of the pivoting plate.

9. The door module as in claim 8, wherein a portion of a vehicle window is located between the pivoting plate and the glass clamping plate.

10. The door module as in claim 9, wherein the seal is located between the vehicle window and the pivoting plate and the glass clamping plate.

11. The door module as in claim 9, wherein a glass clamp screw secures the vehicle window to the pivoting cursor by threadingly engaging a threaded opening in the pivoting plate.

12. The door module as in claim 8, wherein the adjusting screw passes through the opening in the glass clamping plate and the opening in the pivoting plate and the adjusting screw does not threadingly engage the opening in the glass clamping plate and the opening in the pivoting plate.

13. The door module as in claim 8, wherein the first threaded portion and the opening in the main body portion are configured such that rotation of the adjusting screw therein will cause the pivoting plate to pivot about the axis and cause a portion of the pivoting plate to move in a direction away from a portion of the main body portion proximate to the adjusting screw, which will also cause movement of the glass clamping plate, the seal and a window that is received within the seal.

14. The door module as in claim 8, wherein the door module is a front door module or a rear door module and a frameless window is secured to the pivoting cursor.

15. The door module as in claim 8, wherein the pivoting cursor is a pair of pivoting cursors each one of the pair of pivoting cursors being slidably secured to a respective one of the pair of guide rails.

16. A method of mounting a frameless window of a vehicle to a door module, comprising:
securing a portion of the frameless window to a pivoting cursor slidably engaging one of a pair of guide rails of a window regulator secured to the door module; and
adjusting a location of the frameless window by pivoting a pivoting plate of the pivoting cursor with respect to a main body portion of the pivoting cursor, the pivoting cursor further comprising an adjusting screw for pivoting the pivoting plate with respect to the main body portion, the adjusting screw having a first threaded portion for threadingly engaging an opening in the main body portion; and a locking nut for threadingly engaging a second threaded portion of the adjusting screw, wherein the locking nut is located on an inboard side of the pivoting cursor when the window regulator is secured to the door module and the adjusting screw includes a flange portion that is larger than an opening in a clamping plate that the adjusting screw slidably passes through and the flange portion is received in an opening of the pivoting plate.

* * * * *